(12) United States Patent
Packebusch et al.

(10) Patent No.: US 11,154,953 B2
(45) Date of Patent: Oct. 26, 2021

(54) MOUNTING SYSTEM FOR AN ULTRASONIC-WELDING INSTALLATION

(71) Applicant: APTIV TECHNOLOGIES, St. Michael (BB)

(72) Inventors: Swindhard Packebusch, Wuppertal (DE); Michael Kasser, Wuppertal (DE)

(73) Assignee: APTIV TECHNOLOGIES LIMITED

( * ) Notice: Subject to any disclaimer, the term of this patent is extended or adjusted under 35 U.S.C. 154(b) by 218 days.

(21) Appl. No.: 16/307,032

(22) PCT Filed: Jun. 21, 2017

(86) PCT No.: PCT/EP2017/065256
§ 371 (c)(1),
(2) Date: Dec. 4, 2018

(87) PCT Pub. No.: WO2017/220663
PCT Pub. Date: Dec. 28, 2017

(65) Prior Publication Data
US 2019/0217428 A1 Jul. 18, 2019

(30) Foreign Application Priority Data
Jun. 22, 2016 (EP) ..................... 16175801

(51) Int. Cl.
*B23K 37/04* (2006.01)
*B23K 20/10* (2006.01)
(Continued)

(52) U.S. Cl.
CPC .......... *B23K 37/0435* (2013.01); *B23K 20/10* (2013.01); *H01R 43/0207* (2013.01); *B23K 2101/32* (2018.08); *H01R 4/023* (2013.01)

(58) Field of Classification Search
CPC ........ B06B 3/00; B23K 20/10; B23K 20/106; B23K 37/9435; B23K 2101/32; H01R 3/00; H01R 4/023; H01R 43/0207
See application file for complete search history.

(56) References Cited

U.S. PATENT DOCUMENTS

| | | | |
|---|---|---|---|
| 4,596,352 A * | 6/1986 | Knapp | B23K 20/106 228/1.1 |
| 4,736,881 A * | 4/1988 | Niebuhr | B23K 20/106 228/1.1 |

(Continued)

FOREIGN PATENT DOCUMENTS

| | | |
|---|---|---|
| EP | 1960151 A1 | 8/2008 |
| WO | 2007042235 A1 | 4/2007 |

(Continued)

OTHER PUBLICATIONS

Brochure "Industrial ultrasonic solutions", Telsonic Ultrasonics, retrieved from Internet URL:http://www.telsonic.com/fileadmin/userupload/Imagebroschuere_en_2016_low.pdf, Apr. 12, 2016.

*Primary Examiner* — Carl J Arbes
(74) *Attorney, Agent, or Firm* — Billion & Armitage (57) ABSTRACT

A clamping system for an ultrasonic welding apparatus configured to clamp a contact element in the ultrasonic welding apparatus is presented. The contact element has a flat elongate shape and a welding region, a clamping region, and a contacting region arranged along a longitudinal axis. The clamping system includes two clamping units mechanically connected to the ultrasonic welding apparatus which are arranged spaced apart from one another and are moveable toward one another. Each clamping unit defines a clamping finger which is movable to extend over the clamping region. Each clamping finger has a clamping face that is configured to press on a surface of the clamping region that (Continued)

is located opposite an anvil of the ultrasonic welding apparatus while in a clamped state.

19 Claims, 6 Drawing Sheets

(51) Int. Cl.
*H01R 43/02* (2006.01)
*H01R 4/02* (2006.01)
*B23K 101/32* (2006.01)

(56) References Cited

U.S. PATENT DOCUMENTS

| | | | | |
|---|---|---|---|---|
| 4,799,614 A * | 1/1989 | Welter | ................ | B06B 3/00 228/1.1 |
| 4,867,370 A * | 9/1989 | Welter | ................ | B06B 3/00 228/110.1 |
| 5,941,443 A * | 8/1999 | Steiner | ................ | B23K 20/10 228/1.1 |
| 6,299,052 B1 * | 10/2001 | Wnek | ................ | B23K 20/10 228/110.1 |
| 6,719,595 B1 * | 4/2004 | Welcker | ................ | H01R 4/023 439/755 |
| 7,459,653 B2 * | 12/2008 | Steiner | ............... | B23K 11/0026 219/56 |
| 7,533,791 B2 * | 5/2009 | Steiner | ................ | B23K 20/004 228/1.1 |
| 7,878,384 B2 * | 2/2011 | Eberbach | ............. | B23K 20/106 228/1.1 |
| 8,047,420 B2 * | 11/2011 | Stroh | ................ | H01R 43/0207 228/110.1 |
| 8,235,276 B2 * | 8/2012 | Ohnuma | ................ | H01R 4/187 228/110.1 |
| 8,931,685 B2 * | 1/2015 | Kataoka | ................ | H01R 4/021 228/110.1 |
| 2002/0000459 A1 * | 1/2002 | Wnek | ................ | B23K 20/10 228/1.1 |
| 2004/0178249 A1 * | 9/2004 | Gordon, Jr. | ............ | B23K 20/10 228/110.1 |
| 2006/0283912 A1 * | 12/2006 | Eberach | ............. | H01R 43/0207 228/101 |
| 2008/0032569 A1 * | 2/2008 | Steiner | ................ | B23K 20/10 439/874 |
| 2008/0265004 A1 * | 10/2008 | Stroh | ................ | H01R 4/625 228/110.1 |
| 2011/0155701 A1 * | 6/2011 | Gerst | ................ | B23K 11/0026 219/117.1 |

FOREIGN PATENT DOCUMENTS

WO 2008/152000 A1 * 12/2008
WO 2010026173 A1 3/2010

\* cited by examiner

MOUNTING SYSTEM FOR AN ULTRASONIC-WELDING INSTALLATION

CROSS-REFERENCE TO RELATED APPLICATIONS

This application is a national stage application under 35 U.S.C. § 371 of PCT Application Number PCT/EP2017/065256 having an international filing date of Jun. 21, 2017, which designated the United States and claimed priority under Article 8 of the Patent Cooperation Treaty to application Ser. No. 16/175,801.6 filed in the European Patent Office on Jun. 22, 2016, the entire disclosure of each of which is hereby incorporated herein by reference.

TECHNICAL FIELD OF THE INVENTION

The invention relates to a clamping system for an ultrasonic welding apparatus, in particular for clamping a contact element in the ultrasonic welding apparatus. Additionally, the invention relates to a method for clamping a contact element in the clamping system.

BACKGROUND OF THE INVENTION

The high cost of copper and the aim of reducing the weight of motor vehicles in order to thereby also reduce emissions and fuel consumption mean that motor vehicle manufacturers are increasingly using aluminum as a conductor material. Furthermore, the electrification of motor vehicles presents installation space problems in the engine bay. Moving components out of the engine bay, such as moving the battery into the vehicle interior, underneath the front passenger seat or even into the trunk space, are the resulting measures for achieving the required installation space. Thus, cables can often be approximately 5 meters long, which leads to increased consumption of material and increasing costs. Thus, the use of alternative materials is ever more important.

When compared to copper, aluminum has both advantages and drawbacks. On one hand, copper is a better conductor than aluminum and can therefore be made smaller for the same current strength. In general, the cross section of an aluminum cable, depending on the ISO standard cross section, is approximately 60 to 70% larger than the cross section of a copper cable having the same electrical conductivity. On the other hand, aluminum is still up to 44% lighter than copper for the same conductor length, in spite of the larger dimensions.

Ongoing progress in the development of the ultrasonic welding process is increasingly displacing and replacing the crimping process in the case of cross-sectional sizes of greater than 10 $mm^2$. The necessary process reliability and processability can be achieved when processing aluminum cables by ultrasonic welding, which presents new possibilities. The method presents an alternative to crimping even in the case of smaller cross sections and is becoming increasingly adopted in the field of contacting techniques.

Clamping systems used in current ultrasonic welding installations for holding the contact element during welding are free to move in two-dimensional space. These perform two tasks in the process. The first is to clamp a terminal on the anvil so that it does not move under the influence of the ultrasound during the welding process. Also, the clamping jaws bound laterally the space for the introduced cable, and thus serve as a lateral stop and at the same time determine the maximum weld breadth.

With regard to optimum use of resources, clamping systems have some drawbacks. A region that is used only for clamping is taken into account in the construction of the terminal. This clamping region increases the size of the product. In the case of welds with cross sections of 120 $mm^2$, the projecting clamping width is as much as 4 mm. The additional material is advantageous for neither the mechanical nor the electrical properties of the component. Thus, the welding process requires that the terminal be oversized for the clamping procedure. This causes problems in subsequent process steps and in final assembly, and also for the end customer.

The increased width means that it is also necessary to adapt and thus also enlarge the electrical power distribution box. This runs counter to the aim of the automotive industry to always further reduce the weight of motor vehicles. Moreover, increasing the size of the distribution boxes is problematic since the electrification of motor vehicles means that there is less and less installation space available, and therefore every millimeter must be used usefully.

The unit cost for the terminal is above one euro. The price is due in part to the costly material. Here, too, the additional clamping region on the terminal leads to higher costs.

Drawbacks of the existing clamping system have serious effects on the end product. Thus, the contact parts which are welded onto an aluminum cable are much wider than the crimped cable lugs on a copper cable. Accordingly, distribution boxes must also be adapted to the width of welded terminals, or the welded aluminum cables must be led out of the distribution boxes by a very complex geometry of the terminal. This is associated not only with problems of installation space but also with very high construction complexity.

SUMMARY OF THE INVENTION

The object of the invention can be considered that of providing a novel clamping system that can do without the lateral clamping region so that the terminal can be made narrower, thus permitting savings in weight and cost during production of the terminal. Another aim is the continued use of the existing power distribution boxes. This makes it possible to save costs for the new development and adaptation of the boxes.

A clamping system for an ultrasonic welding apparatus for clamping a contact element in the ultrasonic welding apparatus is presented herein. The clamping system includes two clamping units which are arranged spaced apart from one another and are mechanically connected to the ultrasonic welding apparatus. Each clamping unit has a clamping finger, and each clamping finger has an end face. The end faces are opposite one another. Each clamping finger has a clamping face. The clamping faces, in the clamped state, press on the surface of a contact element. Thus, the contact element is pressed against an anvil of the ultrasonic welding apparatus. The contact element has a flat elongate shape and has, along a longitudinal axis, a welding region, a clamping region and a contacting region. The clamping faces, in the clamped state, press on the clamping region of the contact element. The clamping region is arranged between the welding region and the contacting region of the contact element.

A method for clamping a contact element in an ultrasonic welding apparatus by means of a clamping system is also presented herein. The method comprises the following steps:

a) placing a contact element into the clamping system, wherein the contact element is arranged between the clamping units;
b) positioning the contact element such that the clamping region is aligned with the clamping fingers in a direction transverse to the longitudinal axis;
c) moving the clamping units toward one another; and
d) moving the clamping units such that the clamping faces of the clamping fingers are pressed against the clamping region, wherein the clamping region is arranged between the contacting region and the welding region.

Standardized terminals for the applications named here have a very similar construction. The so-called seal region directly behind the welding face is used to seal the conductive touch area. The taper provides improved holding of heat-shrink tubing on the terminal. Prior to sealing, or during the welding process, it is possible to use the face to clamp the workpiece. Since it is not necessary for the welding region to have any faces for clamping the contact element, it can be used in its entirety for contacting the individual wires. This makes it possible to use narrower contact elements for a given cable cross section. It is also possible, for a given contact element width, for larger cable cross sections to be attached to this now-wider welding region.

According to one embodiment, in the clamped state, the welding region of the contact element is bounded in the direction of the longitudinal axis by the clamping fingers. This construction has the advantage of simplifying the positioning of the wire ends when the electric cable is put in place. The clamping fingers serve as a temporary stop for the wire ends. During welding, the wire ends must however be slightly removed from the clamping fingers since they expand due to the temperature change.

Preferably, in the clamped state, the welding region, which extends transversely to the longitudinal axis from a first edge to a second edge over the surface of the contact element, is bounded by bounding faces of the clamping units. The bounding faces bound the welding region. In the clamping system according to the invention, it is possible to use the entire welding region for welding, since it is not necessary for any regions of the welding region to be provided for clamping.

Preferably, the two clamping units can be moved toward one another. The movable construction of the clamping units facilitates the placement of the contact element during assembly. The clamping units can for example be moved by pneumatic modules.

According to another embodiment, the clamping fingers, in the clamped state, are arranged with their end faces touching one another or close to one another and are spaced apart from one another in the non-clamped state. This arrangement makes it possible to maximize the size of the contact face of the clamping region, and of the clamping faces of the clamping fingers. A large contact face makes it possible to hold the contact element reliably but at low contact pressure.

Preferably, the clamping fingers have a pyramid-shaped knurled surface on the clamping faces. During clamping, the pyramids press into the material of the contact element and hold the contact element in position during the welding procedure.

According to another embodiment, the contact pressure acting on the contact element during clamping is less than 15 $N/mm^2$. The magnitude of the contact pressure must be considered critical since excessive contact pressure results in material deformation of the contact element in the clamping region.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
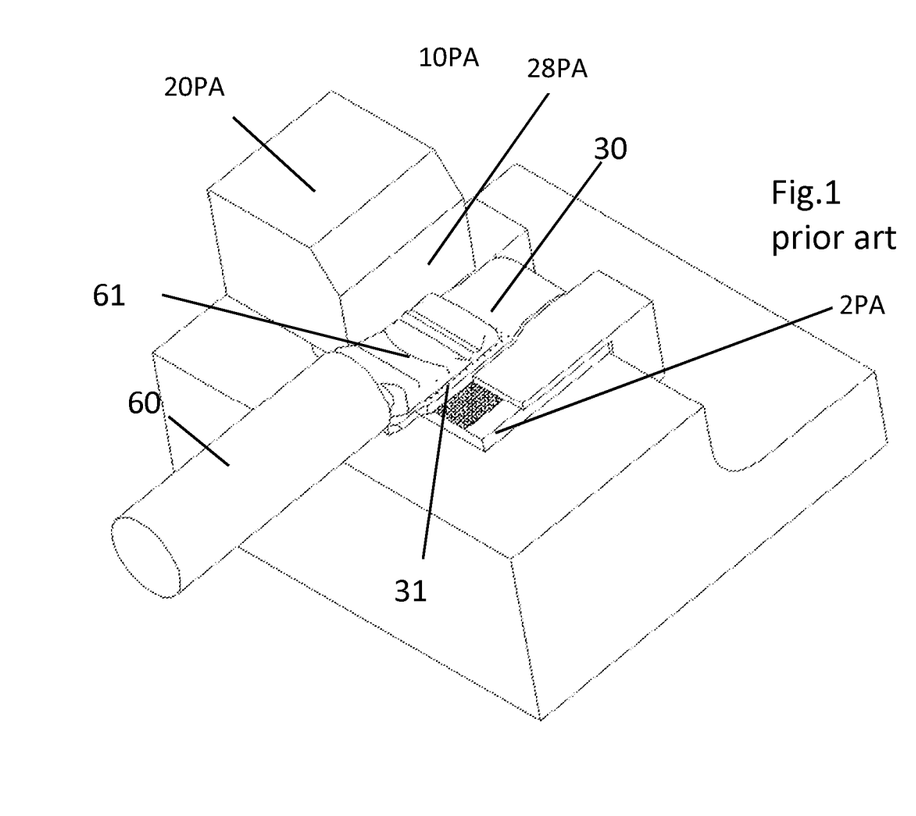
FIG. 1 is a perspective view of a part of a clamping system, according to the prior art.

FIG. 1 shows, in perspective view, part of the clamping system 10PA according to the prior art in the clamped state. This depiction shows just one clamping unit 20PA so as not to obscure the contact element 30 and the individual wires 61. A lower face of the clamping unit 20PA presses on a peripheral region of the welding region 31 of the contact element 30 so as to press the rear face of the contact element 30 against an anvil 2PA of the ultrasonic welding apparatus 1PA. Due to the second clamping unit, which is not shown, it can be seen that during welding not the entire width of the welding region 31 is covered with individual wires 61.

Figure 2:
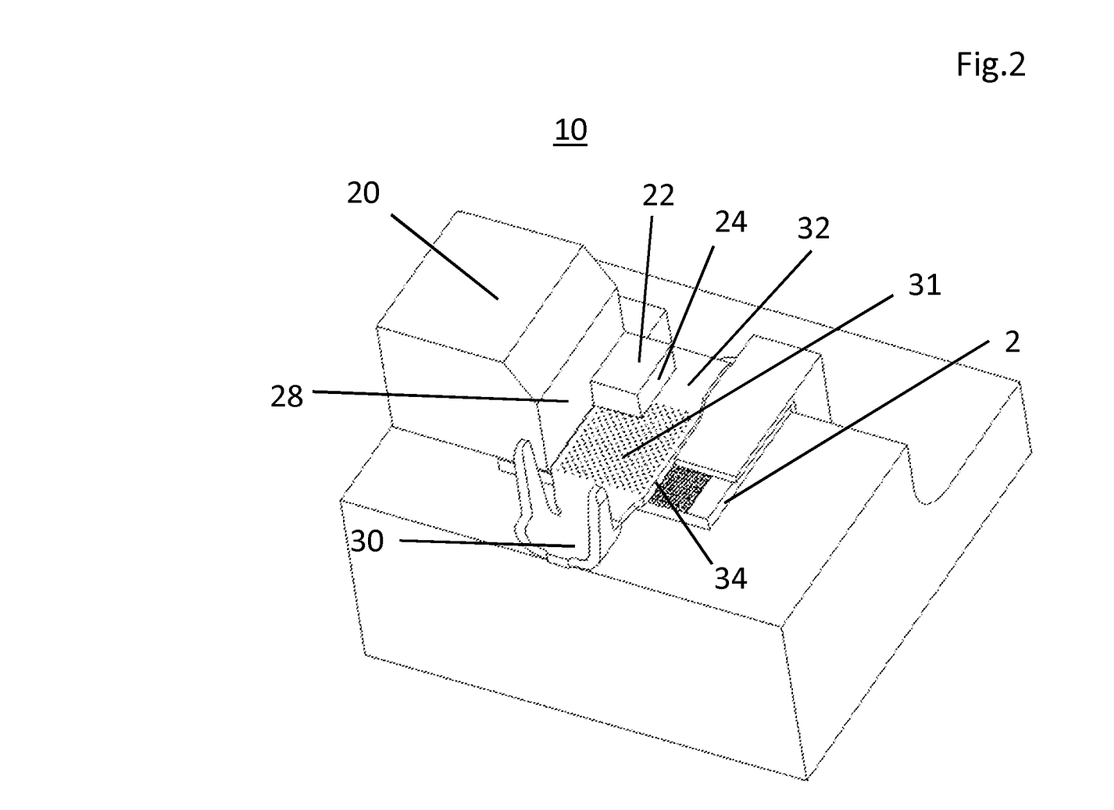
FIG. 2 is a perspective view of a part of a clamping system with a contact element in the clamped state, according to an embodiment of the invention.

FIG. 2 shows, in perspective view, the clamping system 10 in the clamped state, holding a contact element 30. The first and second clamping units 20, 21 are arranged symmetrically with respect to the longitudinal axis X of the contact element 30. Only the first clamping unit 20 is shown, so as to make the contact element 30 more visible. The first and second clamping units 20, 21 are brought together such that the first and second end faces 24, 25 of the first and second clamping fingers 22, 23 touch one another or at least almost touch. The first and second clamping units 20, 21 are also lowered so that the first and second clamping faces 26, 27 lie on the clamping region 32 of the contact element 30 and press the latter against the anvil 2. The welding region 31 is surrounded by the first and second clamping fingers 22, 23 and the first and second bounding faces 28, 29 that are formed by the first and second clamping units 20, 21. The first edge 34 of the contact element 30 adjoins a first bounding face 28 of the first clamping unit 20. On the other side, the second edge 35 of the contact element 30 adjoins a second bounding face 29 of the second clamping unit 21. During the welding procedure, the individual wires 61 are introduced into this space, which is closed on three sides, and are welded to the contact element 30. This construction allows the individual wires 61 to make contact with the entire welding region 31. There is no need for a clamping face at the sides of the welding region 31.

Figure 3:
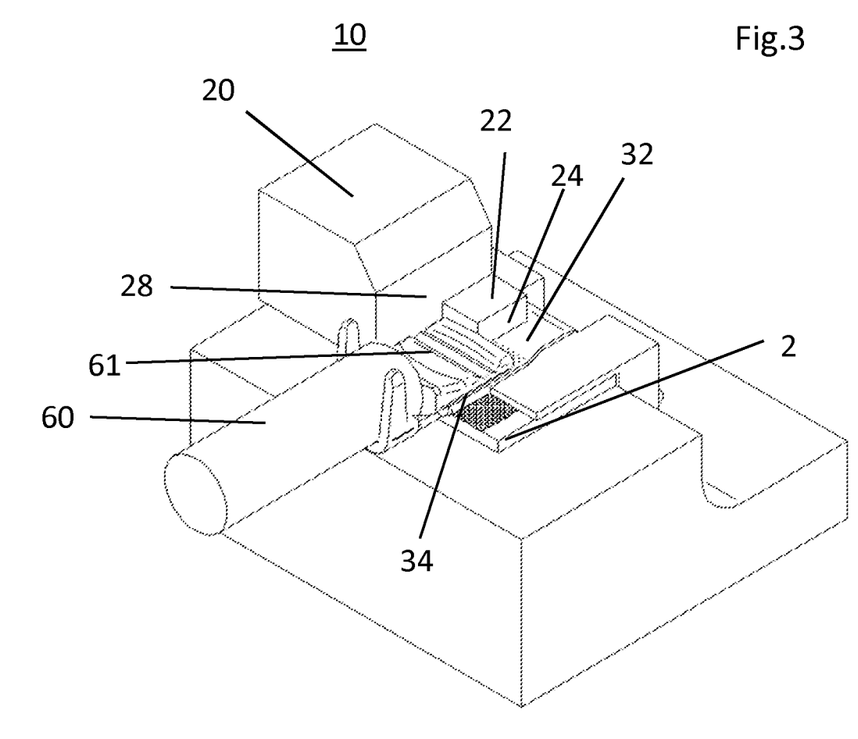
FIG. 3 is a perspective view of a part of the clamping system after the completed welding procedure with a contact element and a welded-on electrical cable, according to an embodiment of the invention.

FIG. 3 shows a plan view of the clamping system 10 with a welded-on electric cable 60, in the clamped state. Here, too, the second clamping unit 21 is not shown for the sake of clarity. This depiction shows that the contact element 30 is clamped in the clamping system 10 such that the central region of the contact element 30 is immobilized by the clamping FIGS. 22, 23. The individual wires 61 of a welded-on electric cable 60 are shown in the welding region 31. In this variant, the contacting region 33 of the contact element 30 is curved and extends into the plane of the drawing. If FIG. 3 were also to show the second clamping unit 21, it would be clear how the first and second bounding faces 28, 29 and the first and second clamping fingers 22, 23 surround the welding region 31 in a U-shaped manner.

Figure 4A:
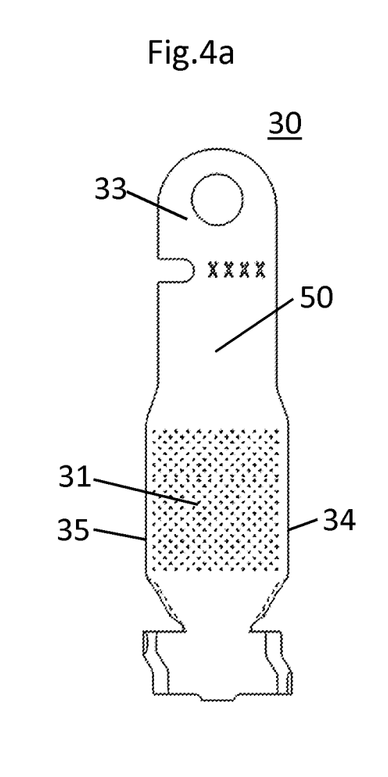
FIGS. 4a through 4c are plan views comparing the old and new clamping regions on the contact element, according to an embodiment of the invention.
Figure 4B:
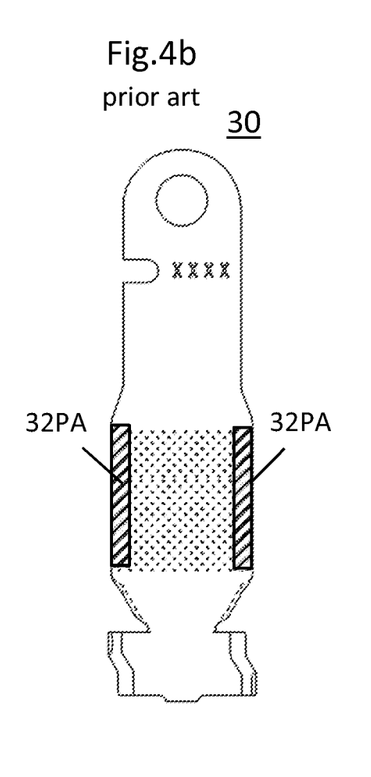
Figure 4C:
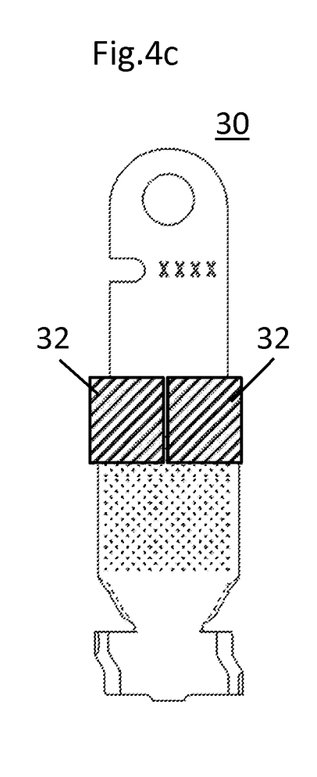

FIGS. 4a to 4c shows a contact element 30, such as is used in an ultrasonic welding apparatus 1. The contact element 30 can be split essentially into three regions. The contacting region 33 serves for connecting the contact element 30 to a complementary contact element or a screw connection (bolt). Adjoining this is a region which is used in a conventional fashion to seal the contact element 30. In the clamping system 10 described here, this region is used, at least in part, as the clamping region 32. The welding region 31 adjoins the seal region. In some embodiments of contact elements 30, adjoining the welding region 31 is a crimp region which serves to additionally hold the welded-on electric cable 60 on the contact element 30.

FIGS. 4b and 4c show a comparison, in plan view, of the clamping region 32PA of prior art clamping systems 10PA (see FIG. 4b) and the clamping region 32 of the clamping system 10 according to an embodiment of the invention (see FIG. 4c). FIG. 4b shows that the clamping region 32PA runs along the first and second edges 34, 35 of the welding region 31. In order to not restrict the welding region 31 too much, these clamping regions 32PA are very narrow. In order to nonetheless hold the contact element 30 securely, the prior art clamping systems 10PA necessitates working with a high contact pressure. In FIG. 4c, the clamping region 32 is configured with a large surface area in the seal region of the contact element 30. The larger surface area makes it possible to reduce the required force per unit of surface area.

Figure 5:
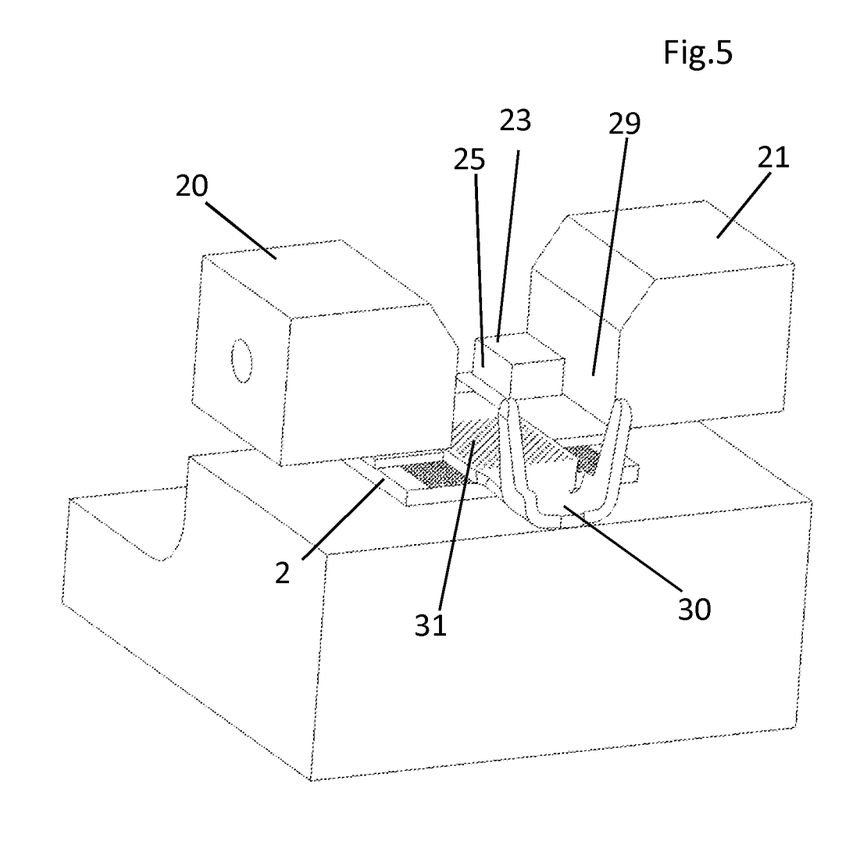
FIG. 5 is a perspective view of a part of the clamping system in the non-clamped state, according to an embodiment of the invention.

FIG. 5 is a perspective illustration of the clamping system 10, in the non-clamped state. The first and second clamping units 20, 21 of the clamping system 10 have each moved outward from the contact element 30 and also away from the clamping position. In this position, a contact element 30 can be placed in the clamping system 10 or removed therefrom.

Figure 6:
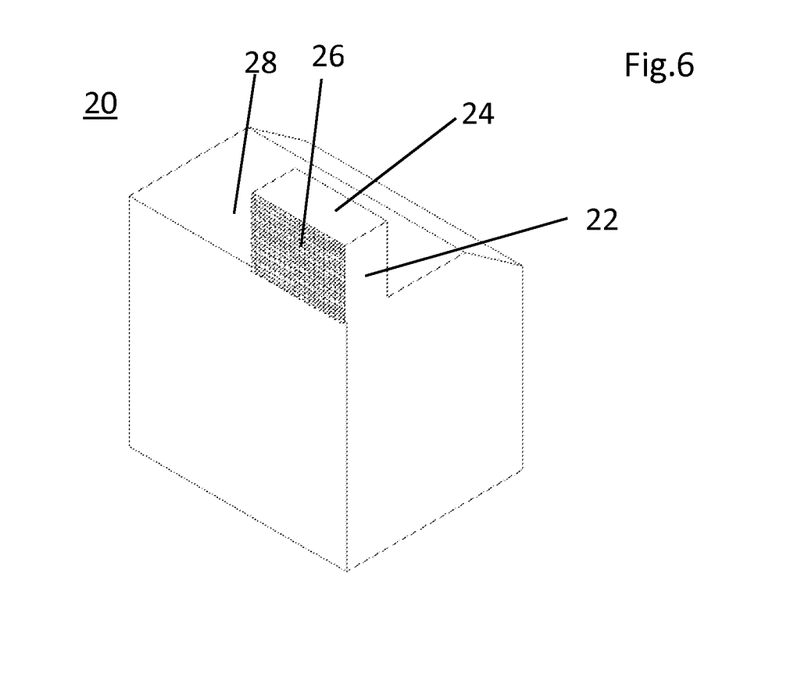
FIG. 6 is a perspective view of the clamping region facing the contact element of a clamping unit, according to an embodiment of the invention.

FIG. 6 shows a perspective illustration of the first clamping unit 20. FIG. 6 shows the first clamping face 26 of the first clamping finger 22. In this embodiment, the first clamping face 26 is provided with a pyramid-shaped knurling.

The invention claimed is:

1. A clamping system for an ultrasonic welding apparatus configured to clamp a contact element in the ultrasonic welding apparatus, the contact element having a flat elongate shape and a welding region, a clamping region, and a contacting region arranged along a longitudinal axis, the clamping system comprising:

two clamping units which are arranged spaced apart from one another and are mechanically connected to the ultrasonic welding apparatus, wherein each clamping unit has a clamping finger, wherein each clamping finger has an end face and these end faces are opposite one another, wherein each clamping finger has a clamping face, wherein the clamping faces press on a surface of the contact element when in a clamped state, whereby the contact element is pressed against an anvil of the ultrasonic welding apparatus, wherein the clamping faces press on the clamping region of the contact element when in the clamped state, wherein the clamping region is arranged between the welding region and the contacting region of the contact element, and wherein the clamping region constitutes a flat planar portion of the contact element.

2. The clamping system according to claim 1, wherein the welding region of the contact element is bounded in a direction of the longitudinal axis by the clamping fingers when in the clamped state.

3. The clamping system according to claim 1, wherein the welding region, which extends transversely to the longitudinal axis from a first edge to a second edge over the surface of the contact element, is bounded by bounding faces of the two clamping units when in the clamped state.

4. The clamping system according to claim 1, wherein the two clamping units can be moved toward one another.

5. The clamping system according to claim 1, wherein the clamping fingers are arranged with the end faces touching one another or close to one another and are spaced apart from one another in a non-clamped state.

6. The clamping system according to claim 1, wherein the clamping fingers have a pyramid-shaped knurled surface on the clamping faces.

7. The clamping system according to claim 1, wherein a contact pressure acting on the contact element during clamping is less than 15 N/mm$^2$.

8. The clamping system according to claim 1, wherein the clamping finger is movable to extend over the clamping region.

9. The clamping system according to claim 1, wherein the clamping face is configured to press on a surface of the clamping region that is located opposite the anvil of the ultrasonic welding apparatus.

10. The clamping system according to claim 1, wherein the two clamping units are arranged spaced apart from one another and are moveable toward one another.

11. A clamping system for an ultrasonic welding apparatus configured to clamp a contact element having a flat elongate shape and having a welding region and a clamping region arranged along a longitudinal axis in the ultrasonic welding apparatus, the clamping region constituting a flat planar portion of the contact element, the clamping system comprising:

two clamping units arranged opposite one another and mechanically connected to the ultrasonic welding apparatus, wherein each clamping unit has a bounding face that contact an edge of the contact element when the clamping units are in a clamped state, wherein each clamping unit has a clamping finger extending from the bounding face, wherein each clamping finger has an end face and these end faces are arranged opposite one another, wherein each clamping finger has a clamping face that press on a surface of the contact element that is arranged opposite an anvil of the ultrasonic welding apparatus and arranged perpendicularly to the edges of the contact element when the clamping units are in the braced state, thereby pressing the contact element against the anvil of the ultrasonic welding apparatus.

12. The clamping system according to claim 11, wherein the clamping faces press on the clamping region of the contact element in the clamped state.

13. The clamping system according to claim 11, wherein the welding region extends transversely to the longitudinal axis from a first edge to a second edge over the surface of the contact element and wherein the welding region is bounded by the bounding faces of the two clamping units when the clamping units are in the clamped state.

14. The clamping system according to claim 11, wherein the two clamping units are movable toward one another.

15. The clamping system according to claim 11, wherein the clamping fingers are arranged with the end faces close to one another when the clamping units are in the clamped state and are spaced apart from one another when the clamping units are in a non clamped state.

16. The clamping system according to claim 11, wherein the clamping fingers are arranged with the end faces touching each another when the clamping units are in the clamped state and are spaced apart from one another when the clamping units are in a non-clamped state.

17. The clamping system according to claim 11, wherein the clamping fingers have a pyramid-shaped knurled surface on the clamping faces.

18. The clamping system according to claim 11, wherein a contact pressure applied to the clamping region by the two clamping units is less than 15 N/mm$^2$.

19. A method for clamping a contact element in an ultrasonic welding apparatus by means of a clamping system having two clamping units which are arranged spaced apart from one another and are mechanically connected to the ultrasonic welding apparatus, wherein each clamping unit has a clamping finger, wherein each clamping finger has an end face and these end faces are opposite one another, wherein each clamping finger has a clamping face, wherein the clamping faces, in a clamped state, press on a surface of the contact element, whereby the contact element is pressed against an anvil of the ultrasonic welding apparatus, wherein the contact element has a flat elongate shape and has, along a longitudinal axis, a welding region, a clamping region and a contacting region, the clamping region constituting a flat planar portion of the contact element, wherein the clamping faces, in the clamped state, press on the clamping region of the contact element located opposite the anvil, wherein the clamping region is arranged between the welding region and the contacting region of the contact element, said method comprising the following steps:

a) placing the contact element into the clamping system, wherein the contact element is arranged between the two clamping units;
b) positioning the contact element such that the clamping region is aligned with the clamping fingers in a direction transverse to the longitudinal axis;
c) moving the two clamping units toward one another;
d) moving the two clamping units such that the clamping faces of the clamping fingers are pressed against the clamping region, wherein the clamping region is arranged between the contacting region and the welding region.

\* \* \* \* \*